United States Patent [19]

Vahabzadeh

[11] Patent Number: 4,684,358
[45] Date of Patent: Aug. 4, 1987

[54] CONTINUOUSLY VARIABLE TRANSMISSION AND CONTROL

[75] Inventor: Hamid Vahabzadeh, Rochester Hills, Mich.

[73] Assignee: General Motors Corporation, Detroit, Mich.

[21] Appl. No.: 881,789

[22] Filed: Jul. 3, 1986

[51] Int. Cl.[4] .............................................. F16H 7/00
[52] U.S. Cl. ......................................... 474/148; 474/8
[58] Field of Search ................... 474/148, 101, 69, 70, 474/8; 74/740, 750 R, 751, 752 R, 752 C, 353, 354, 384

[56] References Cited

U.S. PATENT DOCUMENTS 3,108,484 10/1963 Rabinow .............................. 474/8 X
3,943,786 3/1976 Mills ...................................... 74/384

FOREIGN PATENT DOCUMENTS 1251548 10/1971 United Kingdom .................... 474/8

Primary Examiner—Stephen J. Novosad
Assistant Examiner—Thuy M. Bui
Attorney, Agent, or Firm—Donald F. Scherer

[57] ABSTRACT

A variable diameter pulley and belt drive has a torque and pitch radius sensitive squeeze control. The variable diameter pulleys are interconnected by a flexible belt or chain. The input pulley is connected to a power source through a pair of meshing gears and a floating link. A hydraulic control mechanism establishes the desired diameter ratio of the pulleys while the floating link is responsive to the torque transmitted to adjust the center distance between the pulleys and establish the squeeze force on the belt.

2 Claims, 4 Drawing Figures

CONTINUOUSLY VARIABLE TRANSMISSION AND CONTROL

BACKGROUND OF THE INVENTION

This invention relates to control mechanisms for variable ratio belt drives and more particularly to controls for such drives wherein both the belt squeeze force and the pulley center distance is controlled.

SUMMARY OF THE INVENTION

It is an object of this invention to provide an improved control mechanism for a variable ratio pulley drive wherein the center distance between the pulleys is adjusted for each ratio and wherein the squeeze force on the belt is proportional to the torque transmitted.

It is another object of this invention to provide an improved control mechanism for a variable ratio belt and pulley drive wherein one of the pulley members is mounted on a pivotal axis and connected through gearing to a torque transmitting shaft such that the center distance between the pulleys is adjusted and the pulley squeeze force is proportional to the torque transmitted.

These and other objects and advantages of the present invention will be more apparent from the following description and drawings.

IN THE DRAWINGS

DESCRIPTION OF THE PREFERRED EMBODIMENT

Figure 1:
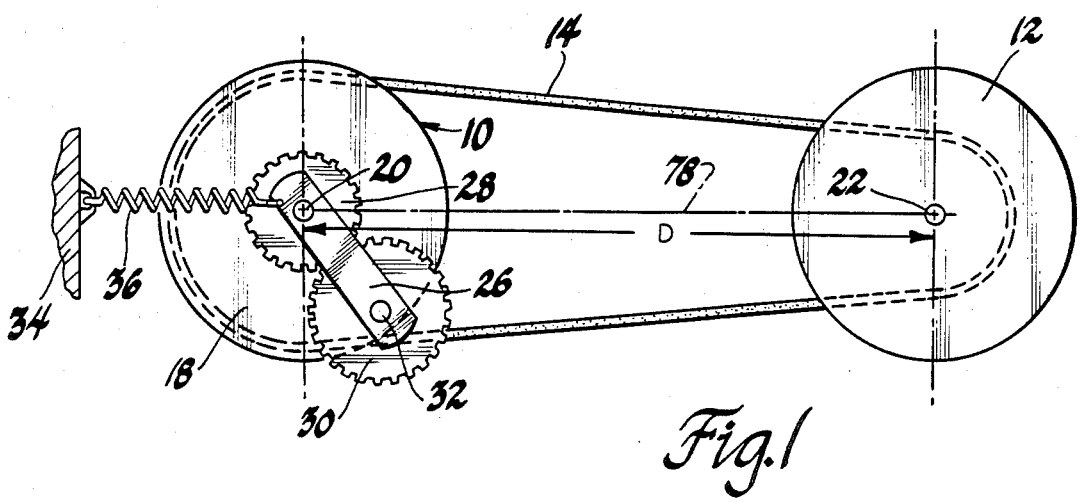
FIG. 1 is a diagrammatic representation of a variable belt and pulley drive.

Referring to the drawings, wherein like characters represent the same or corresponding parts throughout the several views, there is seen in FIG. 1 a pair of variable diameter pulleys 10 and 12 which are connected by a flexible torque transmitting member such as a belt or chain 14.

As is well-known in variable diameter pulley drives, the drive ratio from one pulley to the other is varied by moving the sheaves of the pulleys. For example, in FIG. 3, the pulley 10 has a sheave 16 and a sheave 18. The sheave 16 is fixed for rotation on a shaft 20. The sheave 18 is axially movable on the shaft 20 while being rotatable therewith. As the sheave 18 moves axially away from the sheave 16, the belt 14 will operate at a smaller diameter on the pulley 10.

As is well-known, when the operating diameter of pulley 10 is decreased, the diameter of pulley 12 is correspondingly increased. The pulley 12 is similar in construction to pulley 10 and is operatively connected with a shaft 22. The shaft 22 is the output shaft of the pulley drive. The shaft 20 is rotatably supported in a pair of floating links 24 and 26 and has rotatably secured therewith a gear 28. The gear 28 meshes with a gear 30. The gear 30 is connected to shaft 32 which is rotatably supported in a transmission housing 34. The links 24 and 26 are rotatably or pivotally supported on the shaft 32.

Figure 2:
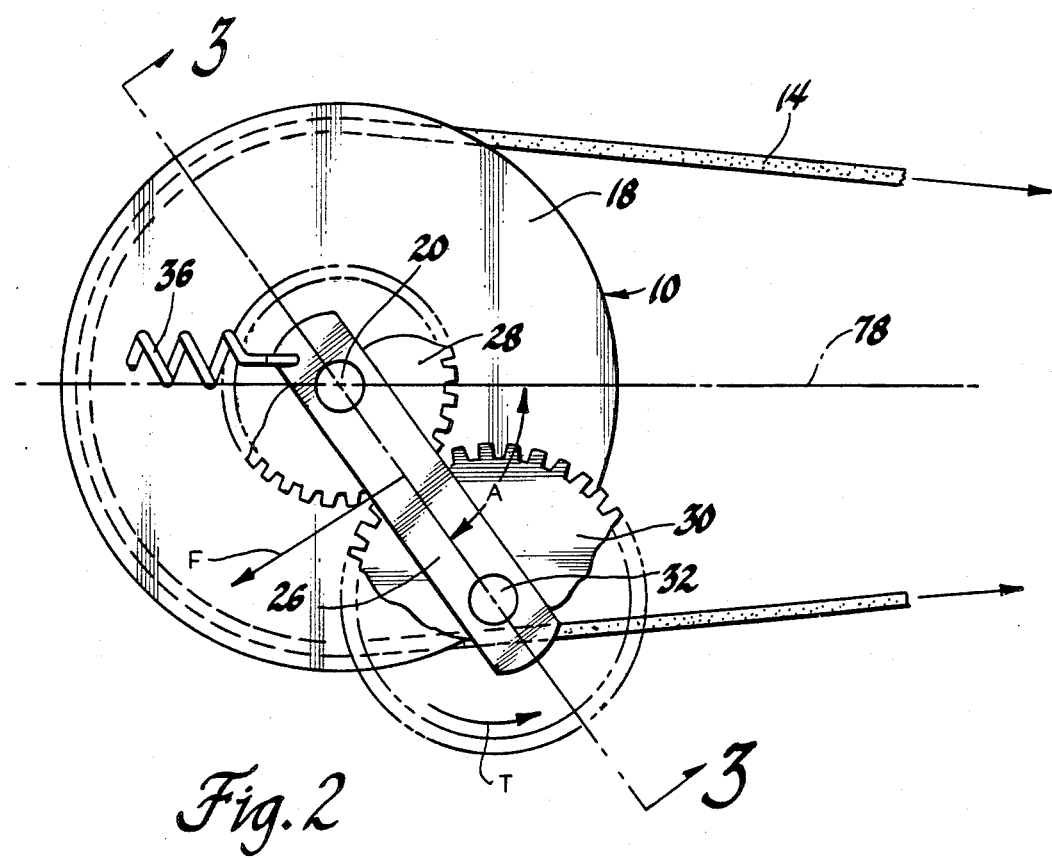
FIG. 2 is an enlarged view of a portion of FIG. 1.

As best seen in FIGS. 1 and 2, the link 26 is operatively connected with the transmission housing 34 by a spring member 36. The link 24 is similarly connected to the transmission housing 34 by a spring, not shown. The springs 36 connecting the links 24 and 26 urge the links 24 and 26 to pivot counterclockwise, as seen in FIGS. 1 and 2, about the axis of shaft 32. The pivoting of links 24 and 26 about the shaft 32 affects the center distance D between the pulleys 10 and 12. The center distance D is the distance between the axes of shafts 20 and 22.

The spring 36 establishes a minimum tension force in the belt 14. This tension force establishes the minimum squeeze force between the pulleys 10 and 12 and the belt 14. The spring 36 also establishes the minimum center distance between the pulleys 10 and 12.

The shaft 32 is adapted to be connected to a prime mover such as an internal combustion engine or an electric motor. Therefore, the shaft 32 has imposed thereon the input torque for the variable belt drive. The input torque at shaft 32 is transmitted through gears 30 and 28 to the shaft 20, and therefore to the pulley 10. This input torque is delivered in the direction of Arrow T. The input torque is balanced by a reaction force F imposed on the links 26 and 24. As seen in FIG. 2, this reaction force F urges the links 24 and 26 to pivot counterclockwise about the shaft 32 thereby increasing the tension force in belt 14 and the squeeze forces established between the pulleys 10 and 12 and the belt 14. As the input torque increases, the squeeze force on the belt will also increase.

Figure 3:
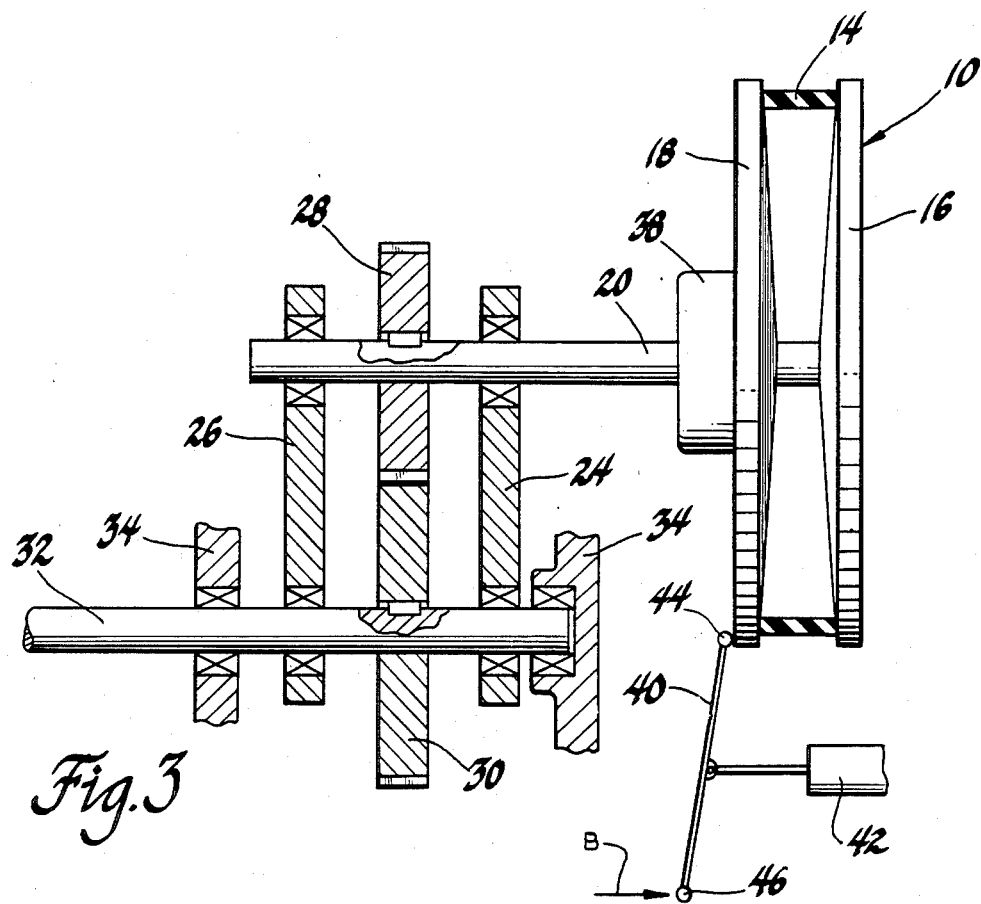
FIG. 3 is a view taken along line 3—3 of FIG. 2.

The pulleys 10 and 14 have their respective movable sheaves, such as 18, controlled by a conventional hydraulic piston and cylinder arrangement 38. As seen in FIG. 3, the movable sheave 18 is operatively connected to a control lever 40 which in turn operates on a control valve 42. One end 44 of control lever 44 abuts the movable sheave 18 while the other end 46 of the lever 40 is subject to operator controls B. The pulley 12 has a similar control arrangement.

Figure 4:
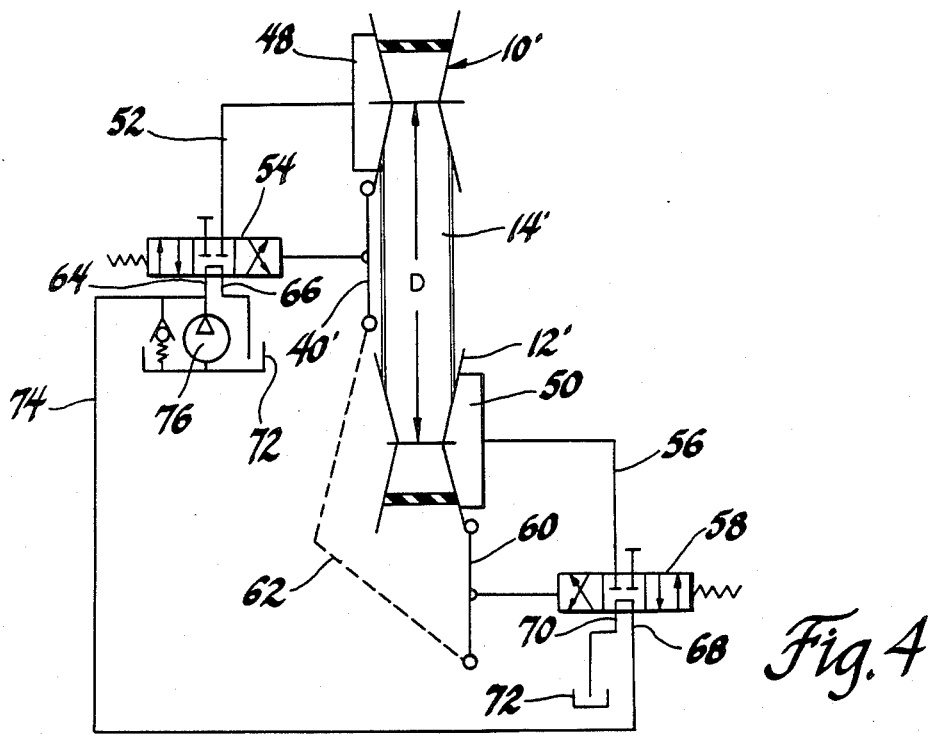
FIG. 4 is a diagrammatic representation of a hydraulic control system for a belt and pulley drive.

There is shown in FIG. 4 a schematic representation of a hydraulic control system which can be utilized to control the operating diameters of the pulleys. In FIG. 4 there is seen a pair of variable diameter pulleys 10' and 12' which are interconnected by a flexible drive member, such as belt 14'. The pulley 10' has a conventional hydraulic control member 48, and the pulley 12' has a conventional hydraulic control member 50. The member 48 is in fluid communication through a passage 52 to a hydraulic control valve 54. The hydraulic control valve 54 is operatively connected to a control lever 40'.

The hydraulic control member 50 is in fluid communication via a passage 56 with a hydraulic control valve 58. The hydraulic control valve 58 is operatively connected with a control lever 60 which in turn is operatively associated with the movable sheave component of the pulley 12'. The control lever 40' and 60 are preferably interconnected through a conventional linkage mechanism 62. The operator only has one control element to manipulate in order to establish the desired operating diameter of both pulleys.

Both of the control valves 54 and 58 are essentially three-position four-way valves having a closed center position. The valves are shown in the closed center position, that is, the passages 52 and 56 are disconnected from either pressure or exhaust when the respective valves are in the center position shown.

The valve 54 has an input port 64 and a return port 66. The valve 58 has an input port 68 and a return port 70. Both return ports 66 and 70 are connected to a hydraulic reservoir 72, while the input ports 64 and 68 are connected via a passage 74 with a conventional hydraulic pump 76. In the center position shown, the pump 76 communicates with the return passage 66 to reduce the hydraulic losses in the system.

If the control levers 40' and 60 are moved by the operator input to the left (under the influence of controls B) as seen in FIG. 3 and 4, the valve 54 will connect the control piston to pressure while the control piston 50 is connected to exhaust. Under this condition, the sheaves of pulley 10' will be moved closer together thereby increasing the operating diameter for the belt 14 while the sheaves of pulley 12' are allowed to separate thereby decreasing the operating diameter of the belt 14' on the pulley 12'. When this occurs, the center distance D between the pulleys 10' and 12' has to be adjusted accordingly. This adjustment takes place automatically through the pivoting of the links 24 and 26 about the shaft 32. Thus, the new operating condition or drive ratio within the pulley system is accommodated. With the use of an adjustable center distance mechanism, the operating diameters for the pulleys 10 and 12 or 10' and 12' can be more accurately controlled. Movement of the control levers 40' and 60 to the right has the opposite effect on the operating diameters of the pulleys 10' and 12'.

In prior art arrangements, the variable ratio pulley drives accommodate the apparent change in belt length by establishing one pulley as the command pulley and the other as a slave pulley. In other words, the operator establishes the operating diameter of the master pulley and a spring, mechanical cam or fixed pressure hydraulic system generally controls the positioning of the slave pulley.

This makes it very difficult to provide a simple operator lever control which will establish accurate diameter relationships between the pulleys without providing sophisticated speed signals to ensure that the desired drive ratio is established. With the present invention, the control levers 40' and 60 can be designed with an appropriate link system such that the hydraulic control valves 54 and 58 will establish the desired diameter ratio while the links 24 and 26 will establish the correct center distance D and in response to the torque T the links 24 and 26 will also operate to establish the proper squeeze force between the belt 14 and the pulleys 10 and 12.

This system provides a squeeze force having a magnitude proportional to the torque and proportional to the pitch radius on the output pulley. The reaction force created by the input torque T creates the tension in the drive belt 14. This tension is balanced by the squeeze force of the pulleys and therefore the squeeze force is also proportional to the transmitted torque.

As seen in FIG. 2, the links 24 and 26 operate at an angle A relative to a plane connecting the centers of the pulleys 20 and 22 and represented by the line 78. The component of the reaction force F which establishes the tension in belt 14 is modified by the sine of the angle A such that the position of the pulleys is controlled in a manner such that the change in angle A is inversely proportional to the pitch radius.

From the foregoing discussion, it should be apparent that the present system provides a control wherein the torque sensitivity is proportional to the reaction force and the pitch radius sensitivity is controlled by the position of the two pulleys.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A continuously variable drive mechanism and torque loading mechanism comprising; a variable diameter V-groove pulley having at least one movable sheave; a second V-groove pulley; a flexible torque transmitting torque between said V-groove pulleys; a first gear member mounted on said variable diameter V-groove pulley for rotation therewith; first rotary support means for rotatably supporting said first gear member and said variable diameter V-groove pulley; a second gear member disposed in torque transmitting relation with said first gear member; stationary rotary support means for rotatably supporting said second gear member; link means connecting said first rotary support means and said stationary rotary support means for permitting said first rotary support means to pivot about said stationary rotary support means in response to the torque being transmitted in said flexible torque transmitting means to establish the squeeze force in the flexible torque transmitting means and to control the center distance between the pulleys; and force transmitting means operatively connected with said link means for imposing a force thereon which establishes the minimum torque transmitting requirement for said flexible torque transmitting means prior to pivoting of said first rotary support about said stationary rotary support.

2. A continuously variable drive mechanism and torque loading mechanism comprising; a first variable diameter V-groove pulley having at least one movable sheave; a second variable diameter V-groove pulley; a flexible torque transmitting means subjected to a squeeze force for transmitting torque between said V-groove pulleys; means for varying the diameters of the variable diameter V-groove pulleys; a first gear member mounted on said variable diameter V-groove pulley for rotation therewith; pivotable rotary support means for rotatably supporting said first gear member and said variable diameter V-groove pulley; a second gear member disposed in torque transmitting relation with said first gear member; stationary rotary support means for rotatably supporting said second gear member; link means connecting said pivotable rotary support means and said stationary rotary support means for permitting said pivotable rotary support means to pivot about said stationary rotary support means in response to the torque being transmitted in said flexible torque transmitting means to establish the squeeze force in the flexible torque transmitting means and to control the center distance between the variable diameter V-groove pulleys; and force transmitting means operatively connected with said link means for imposing a force thereon which establishes the minimum torque transmitting means prior to pivoting of said pivotable rotary support means about said stationary rotary support means.

* * * * *